Patented Dec. 2, 1924.

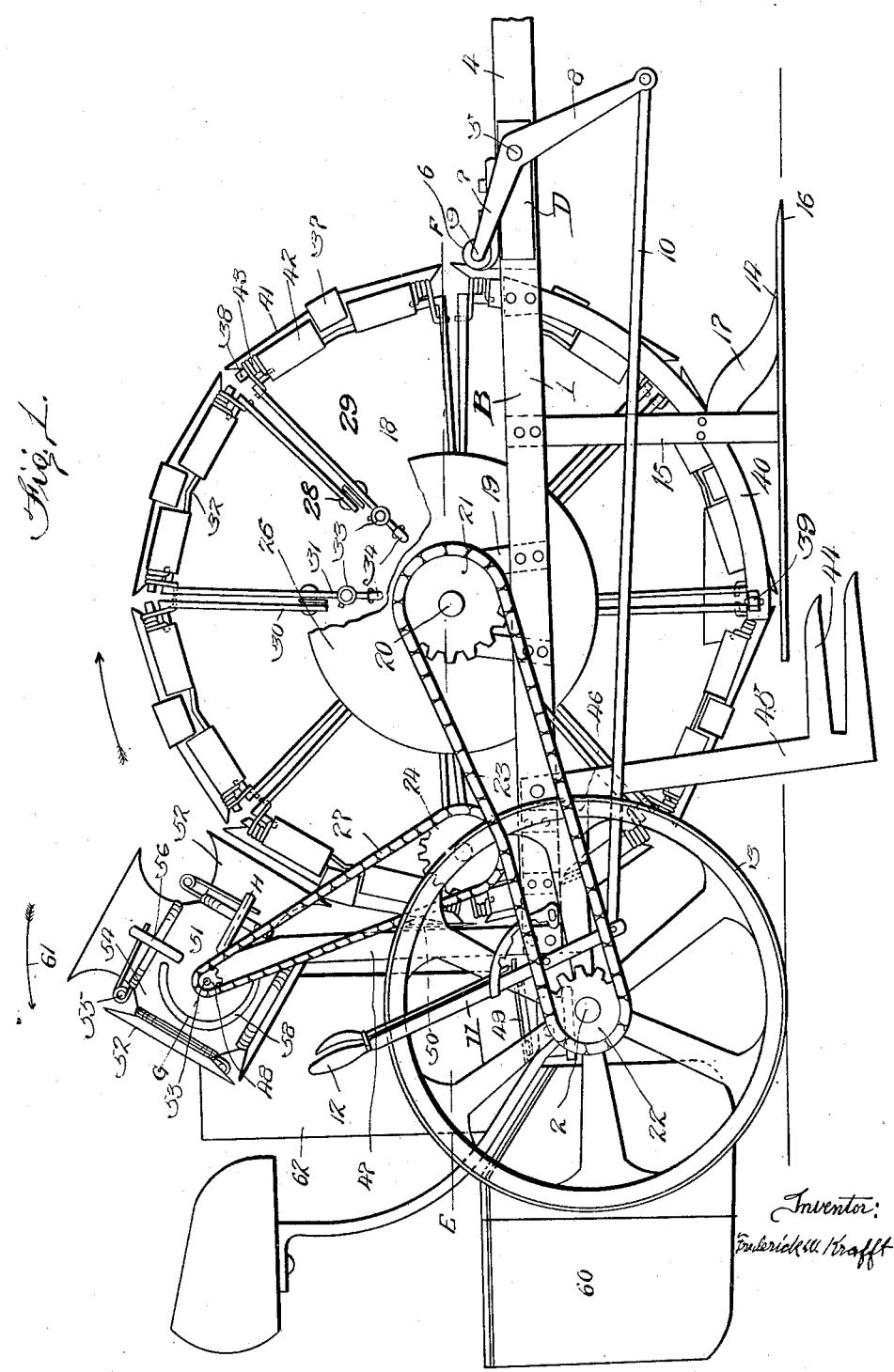

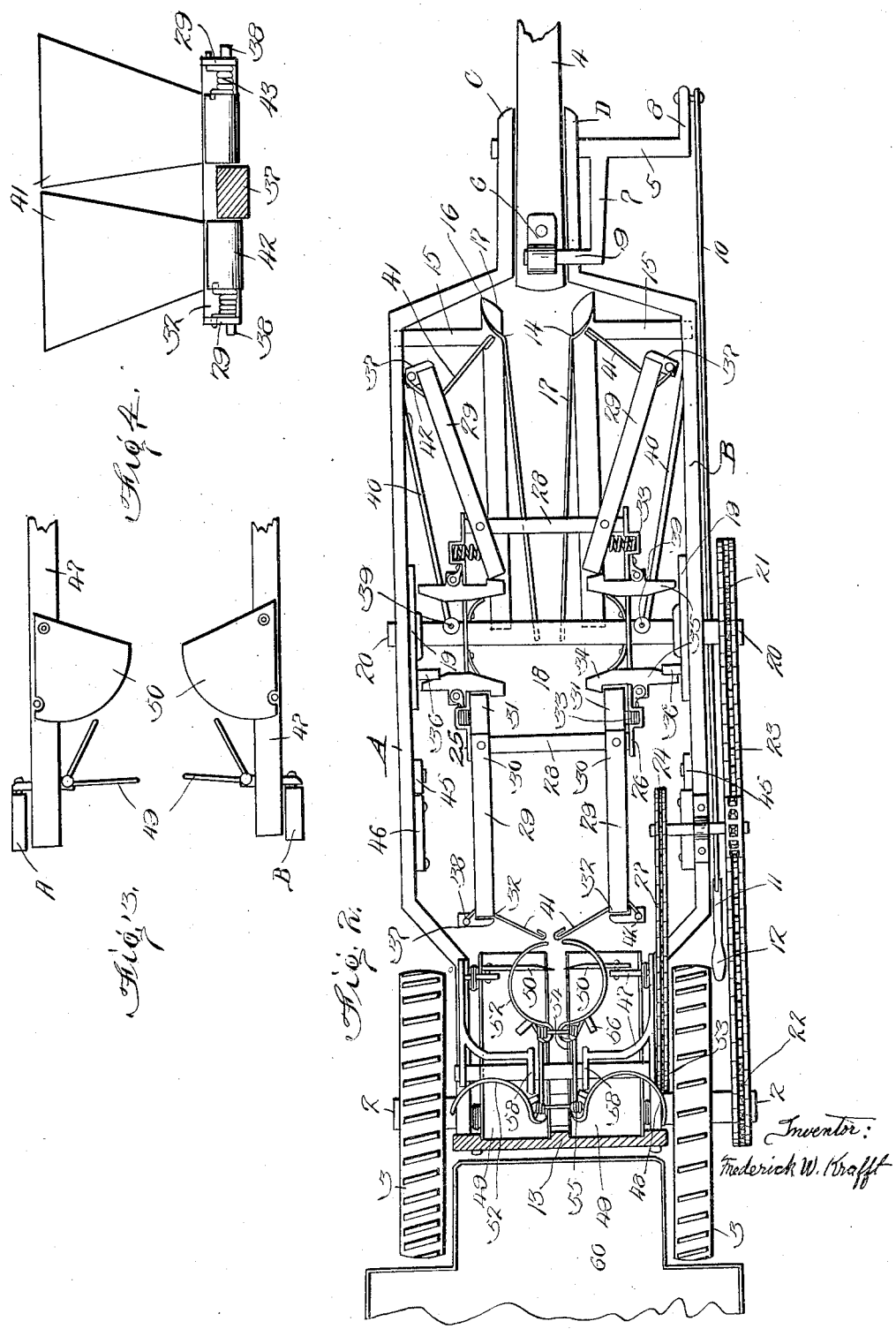

1,517,642

UNITED STATES PATENT OFFICE.

FREDERICK W. KRAFFT, OF BERKELEY, CALIFORNIA.

SUGAR-BEET HARVESTER.

Application filed February 12, 1921. Serial No. 444,500.

*To all whom it may concern:*

Be it known that I, FREDERICK W. KRAFFT, a citizen of the United States, residing at Berkeley, in the county of Alameda and State of California, have invented a new and useful Sugar-Beet Harvester, of which the following is a specification.

This invention relates to beet harvesters and more particularly to a harvesting machine which is adapted to grasp the beet top where it is joined to the crown and coact with soil loosening means to pull the beets and top them. One of the main objects of this invention is to provide a machine of the character stated of simple construction and operation in which the beet digging and pulling means, and the topping means are mounted upon a common support, and are so related as to insure ease and accuracy of operation while enabling the beets to be harvested with a minimum of power.

A further object is to provide simple means for supporting the beet leaves as the top is being grasped.

Other objects will be shown in the detailed description.

In the drawings:

Fig. 1 is a side view of the harvester constructed in accordance with my invention.

Fig. 2 is a top plan view of the same, showing the gripping means on a line E and F and the top extracting device on line G and H of Fig. 1.

Fig. 3 is a view of the topping knives.

Fig. 4 is a top plan view of the gripping blades.

The main supporting frame 1, is of substantially rectangular shape and is composed of two side bars "A" and "B" of flat bar construction.

Depending from the rearward end of the bars "A" and "B" and rotatably secured is the axle 2, upon each end of which is rotatably mounted a ground wheel 3, supplied with ratchet and pawl adjacent the axle 2, in the well known manner to hold and turn the axle during the advancement of the machine. The rearward end of the frame 1 is narrowed, permitting nearer approach of the ground wheels 3 to each other, which wheels 3 are preferably provided with transversely disposed cleats for biting into or gripping the traction surface.

At the forward end of the frame 1, the bars "A" and "B" are bent at an angle inwardly and then forwardly parallel to each other, with a space between them, these ends "C" and "D" composing hounds for the support of the tongue 4, this tongue providing traction attaching means for drawing the machine along a row of beets to be harvested. The tongue 4 is pivotally mounted between the hounds "C" and "D" on the pin or bolt 5, whose outer portion extends laterally of the frame, for the support of the lever bars 7 and 8. A bar 9 extending laterally from lever 7, is attached to the rear end of the tongue 4 by lug 6; lever 8, which extends in the opposite direction to lever 7, is pivotally attached to rod 10. Said rod is extended rearwardly to the lower end of lever 11 and is attached thereto. Lever 11 is secured pivotally to the side sill of frame 1 at its central portion and its upper end is formed into a handle 12.

The purpose of this arrangement is to raise the forward end of main frame 1 and lift the beet extracting means above the traction surface at certain times. This is accomplished by bringing the lever handle 12 forward, thus lifting the rear end of the tongue to an angle above the hounds "C" and "D". The up and down movement of the end of the tongue is not restricted during the operation of the machine along a row of beets. Devices 14 for the purpose of lifting up and pressing together the beet leaves as the machine advances depend from the lower ends of bars 15 whose upper end is secured to the side bars of the main frame 1 at the forward end thereof, being plow resembling devices having a flat lying shear 16, and a mould board 17, which extends upward and rearward in a curved shape so that when the shear 16 passes under the beet leaves they are gathered, lifted up and pressed together centrally above the row of beets by the mould boards 17 which operate opposite to each other; the shear 16 extends rearwardly for the purpose of smoothing the soil and keeping it from coming in contact with the beet top gripping means; the rearwardly extending part of the mould board 17 is positioned above the beet crown leaving a space between the shear 16 and the lower edge of mould board 17 for the engagement of the beet top by the gripping means. Mounted centrally of the main frame 1 is the gripping wheel 18 which is of larger diameter than the ground wheels 3 whose shaft or axle 20 is rotatably mounted in the brackets 19 which extend up from the frame 1 so that the lowermost part of said wheel 18 is above and adjacent to the ground over which it operates.

The outwardly extending end of the shaft 20 supports a sprocket wheel 21 which is connected with the sprocket wheel 22 on the end of the axle 2 by the chain 23; by this means the gripping wheel 18 is rotated during the advancement of the machine from the ground wheels 3. The speed and movement of the outermost part of the gripping wheel 18 is the same as it would be if the wheel 18 were rolling on the ground.

The circular disks 25 and 26 which centrally encircle the shaft 20 and are securely attached thereto are spaced equal distances to the side of the center of the main frame 1 at right angles with said shaft 20. A plurality of brace bars 28 extend across from rim to rim of the disks 25 and 26 and are secured thereto. A plurality of triangular frames 29 which have an open end are positioned edge to edge in a radial manner around the disks 25 and 26. They are hingedly secured on both sides of the bars 28 adjacent the disks 25 and 26, forming two rows of frames 29 facing each other around the wheel 18 and whose hinge motions are to and from each other. Each frame 29 is attached to two consecutive bars 28 by the arms 30 and 31 of the open end of the triangle frame 29, each frame 29 filling the space between two bars 28. The arm 31 of each frame 29 has an elongated end which engages the expansion coil spring 33 which acts to force the outer end of frame 29 outwardly. The spring ratchet pawl 34 is designed to engage and hold the end of arm 31 at proper times. The extended end of ratchet 34 constitutes a tripping finger 35 to engage the tripping arm 36 to be described. The pressure block 37 is centrally secured to the outer edge of member 32 of the frame 29 for engagement with the arcuate guide member 40 depending from the frame 1, two guide members being provided, one on each side of the gripping wheel 18 whose curve is concentric with shaft 20 and positioned forward of the vertical plane of the axis of said shaft 20; they incline toward each other downwardly, causing a gradual bringing together of the frames 29 as they pass between these guides 40 in their downward movement, the gripping means being brought to rest upon the crown of the beet body.

A roller 39 placed in the lower end of the guide members 40 engages the block member 37, forcing it suddenly inward as it reaches its lowermost position.

Imbedded in the block 37 are rods 38 extending parallel to said member 32 on each side of said block 37 upon which are mounted pivotally the gripping blades 41 having a bent portion 42 near the hinge part and whose straight portion 41 extends inwardly over the member 32 toward the center of the wheel 18, inclining downwardly to bring the end of blade 41 into the horizontal plane of the hinge part 42, the member 32 forming a positive stop for the blade 41, the coil spring 43 on the end of rod 38 acting normally to hold said blade 41 against member 32.

The digging forks 44 are placed one on each side adjacent the gripping wheel 18 and positioned slightly rearward of the vertical plane of the shaft 20, the prongs extending forwardly in the direction of the movement of the machine, being attached to the lower end of the bar 45 whose upper end is hingedly bolted to the frame 1, a stop brace 46 being provided to prevent the rearward movement of the forks 44. The forks coact with the blades 41 to loosen the soil on each side of the beet as it is gripped and pulled by the blades 41.

The topping device is a pair of oscillating knives 50 shown in Fig. 3 attached pivotally to the frame 47. The frame 47 to which the knives 50 are attached is a pair of upright bars.

The lower ends of frame 47 are secured to the side sills of frame 1, adjacent to which and in a horizontal position rearwardly extending are hingedly secured to the said frame 1 the upwardly opening doors 49 having positive stop 13 which is a brace for the frame sills "A" and "B" (see Fig. 2) to prevent downward movement of the doors, between which the beet body must pass as it advances to the knives 50, which doors 49 drop close so the beet will fall upon them and roll into the receptacle 60 placed rearward of the axle 2.

The top removing device is a rotary device 51 pivoted in the frame 47 above the topping device, having 4 sets of S-shaped gripping jaws 52 which are hinged to a pair of parallel substantially square rotary plates 54 which encircle the shaft 53, the jaws 52 acting to close upon the beet crown and draw the beet leaves upward and outward and deposit them in the rear of the device 51 from whence they drop to the side of the incline, 62. Relatively strong coil bar springs 55 act to close the jaws at proper times; lever 56 attached to the curve of the jaw 52 engages the arcuate guide 58 and passes between said guide 58 and the plate 54, which movement forces the jaws of each pair open, as they pass the vertical plane of the shaft 53 in their upward movement, at which point the beet top drops out of the jaws 52. The direction of the revolution of the device is shown by the arrow 61. Motion is supplied to shaft 53 from the chain 23 through the sprocket wheel 24 and chain 27 to sprocket wheel 48. The pairs of jaws 52 move in conjunction with and at the same speed as the gripping blades 41. The tripping arm 36 mentioned previously, which extends from the bracket 19, Figure 2, engages the tripping finger 35 of the ratchet 34, causing it to release the end of arm 31, allowing the coil spring 33 to force the outer end of frame 29 outwardly, which moves the gripping plates 41 away from each other at the time of the closing of the jaws 52; thus the top is released by gripping blades 41 as the jaws grip it.

In operating the machine, the leaves of the beet top are gathered and held by the devices 14, the gripping members 41 are forced against them by the arcuate guides 40 and the roller 39, they are held by the ratchet pawl 34, the soil is loosened by the forks 44, the beet is pulled by the rotation of the axle 20 and carried past the topping knives 50 to the top removing device 51.

It will be evident that there may be slight changes made in the construction and arrangement of the details of my invention without departing from the field and scope of the same, and I intend to include all such variations as fall within the scope of the appended claims, in this application in which a preferred form only of my invention is disclosed.

I am aware that prior to my invention beet harvesters have been invented which pull the beet by the top, I therefore do not claim such a combination broadly.

What I claim is,

1. In a beet harvester, a wheeled supporting frame, a transverse shaft therein, beet top holding means, gripping members cooperating therewith, rotary means for forcing said gripping members toward each other, reciprocating topping means, means for pulling the beet out of the ground by the rotation of said shaft, and means, whereby the topping means are actuated as the gripping means pass them.

2. In a beet harvester a wheel supported frame, a transversely extending shaft rotatably carried thereby, means for rotating said shaft during advancement of the harvester, disks encircling said shaft, frames radiating from said disks, beet top gripping members extending inward from said frames, arcuate guides to close said frames when moving to their lowermost position, springs for holding said gripping means apart and ratchet pawls for holding them in their closed position, upward opening doors, reciprocating topping knives and means for receiving the beet body.

3. In a beet harvester, a wheeled supporting frame, a transverse shaft therein, beet top holding means, gripping members cooperating therewith, rotary means for forcing said gripping members toward each other, reciprocatory topping means, means for pulling the beet out of the ground by the rotation of the said shaft, means whereby the topping means are actuated as the gripping means pass them, and arcuate guides cooperating with said rotary means.

4. In a beet harvester, a portable wheeled supporting frame, a transverse rotary shaft in said frame, arms radiating from said shaft, beet top gripping members carried by said arms, means for closing said gripping members when in their lowermost position, means for holding them closed until the arms pass a horizontal position, means for subsequently releasing them, beet top holding members, reciprocatory topping knives, a rotary topping means, means for removing the tops of the beets, and arcuate guides fixed relatively to said shaft for cooperation with the gripping means.

5. In a beet harvester, a portable supporting frame, a rotatable shaft extending transversely thereof, means for rotating said shaft during advancement of the harvester, a pair of top gripping arms radiating from said shaft and provided at their outer ends with transversely-disposed gripping blades, pivotally-suspended soil-removing forks, means for forcing the arms and gripping blades together, means for releasing them, spring means to force the said gripping means apart, leaf-lifting and folding plows with rearwardly-extending shear, reciprocatory means for topping the beets, and means for extracting the tops.

6. In a beet harvester, a wheel supported frame, a transverse rotary shaft therein, beet top gripping members carried by said shaft, arcuate guides fixed relatively to said shaft to actuate the gripping members, means for holding said gripping members in closed position, means for holding them in open position, reciprocatory topping means, and means for receiving the beet bodies.

7. In a beet harvester, a wheel supported frame, a transverse rotary shaft therein, beet top gripping members carried by said shaft, arcuate guides fixed relatively to said shaft to actuate the gripping members, means for holding said gripping members in closed position, means for holding them in open position, reciprocatory topping means, means for receiving the beet bodies, and tripping means for releasing the gripping-members-holding means.

FREDERICK W. KRAFFT.